(12) United States Patent
Yoo et al.

(10) Patent No.: US 7,582,331 B2
(45) Date of Patent: Sep. 1, 2009

(54) PRINTING APPARATUS AND FABRICATING METHOD THEREOF

(75) Inventors: Hong Suk Yoo, Gunpo-si (KR); Chul Ho Kim, Incheon (KR); Jung Jae Lee, Gwacheon-si (KR); Tae Young Oh, Anyang-si (KR)

(73) Assignee: LG. Display Co., Ltd., Seoul (KR)

( * ) Notice: Subject to any disclaimer, the term of this patent is extended or adjusted under 35 U.S.C. 154(b) by 714 days.

(21) Appl. No.: 11/304,447

(22) Filed: Dec. 14, 2005

(65) Prior Publication Data

US 2007/0000403 A1 Jan. 4, 2007

(51) Int. Cl.
*B05D 5/00* (2006.01)
(52) U.S. Cl. .................. 427/197; 427/211; 427/278; 427/359; 118/46
(58) Field of Classification Search .................. 427/197, 427/211, 278, 359; 118/46
See application file for complete search history.

(56) References Cited

U.S. PATENT DOCUMENTS

| 6,114,404 | A  | * | 9/2000 | Deeken et al. ................. 522/88 |
| 2002/0047560 | A1 | * | 4/2002 | Lee et al. .................. 315/169.3 |
| 2004/0121696 | A1 | * | 6/2004 | Kim ............................ 445/24 |
| 2004/0125328 | A1 | * | 7/2004 | Chae et al. ................... 349/187 |
| 2004/0126678 | A1 | * | 7/2004 | Baek et al. ...................... 430/7 |
| 2007/0138691 | A1 | * | 6/2007 | Sugimoto ................... 264/219 |

* cited by examiner

*Primary Examiner*—Binh X Tran
(74) *Attorney, Agent, or Firm*—Brinks Hofer Gilson & Lione

(57) ABSTRACT

A printing apparatus adapted for printing wide line width and narrow line width patterns with one printing plate when fabricating a liquid crystal display device is disclosed. The printing apparatus includes a printing roll having target pattern forming material spread thereon, a printing substrate have at least one pair of adjacent printing plate patterns and at least one barrier rib pattern therebetween, and a target substrate. The printing substrate is configured to receive target pattern forming material from the printing roll and the target substrate is configured to receive target pattern forming material remaining on the printing roll following transfer of target forming material to the printing substrate.

9 Claims, 16 Drawing Sheets

Cliche plate glass

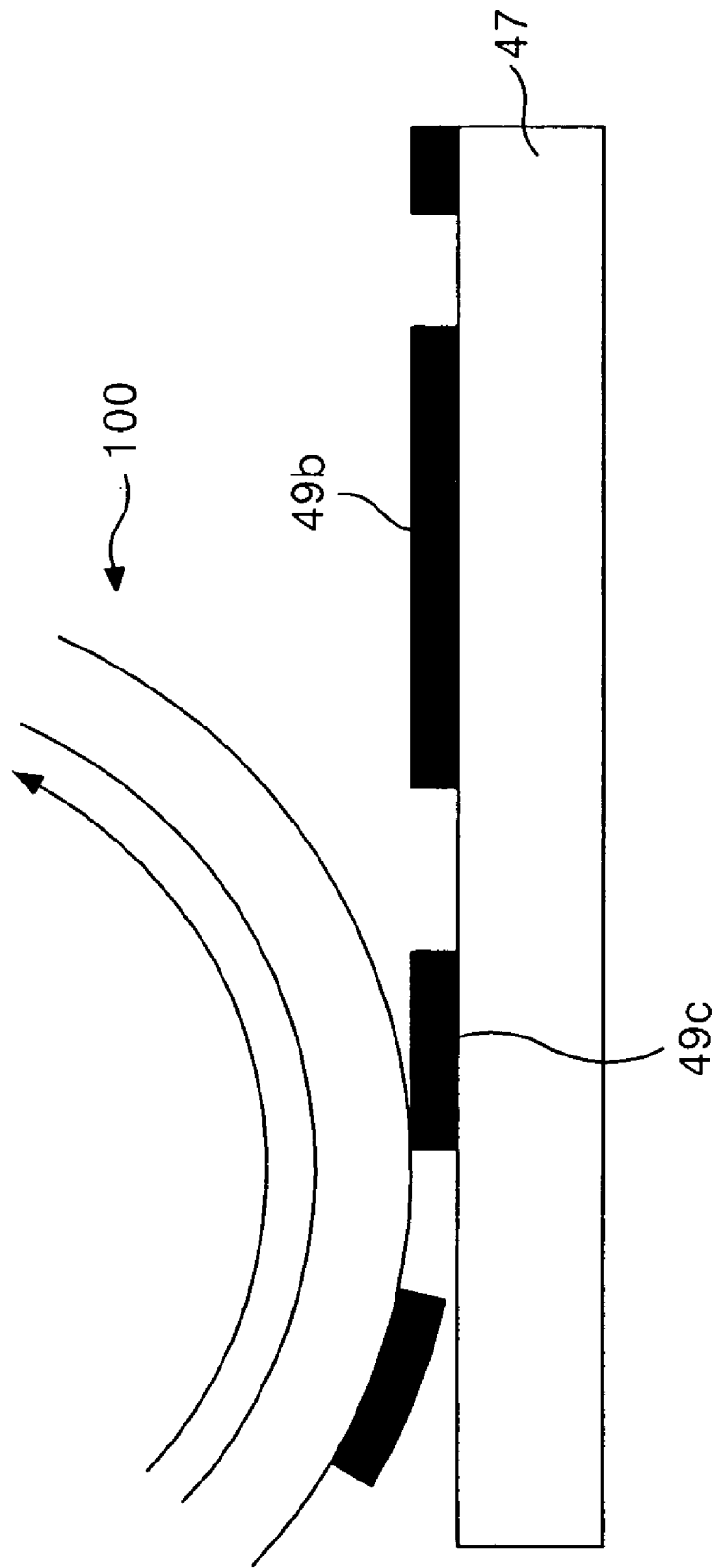

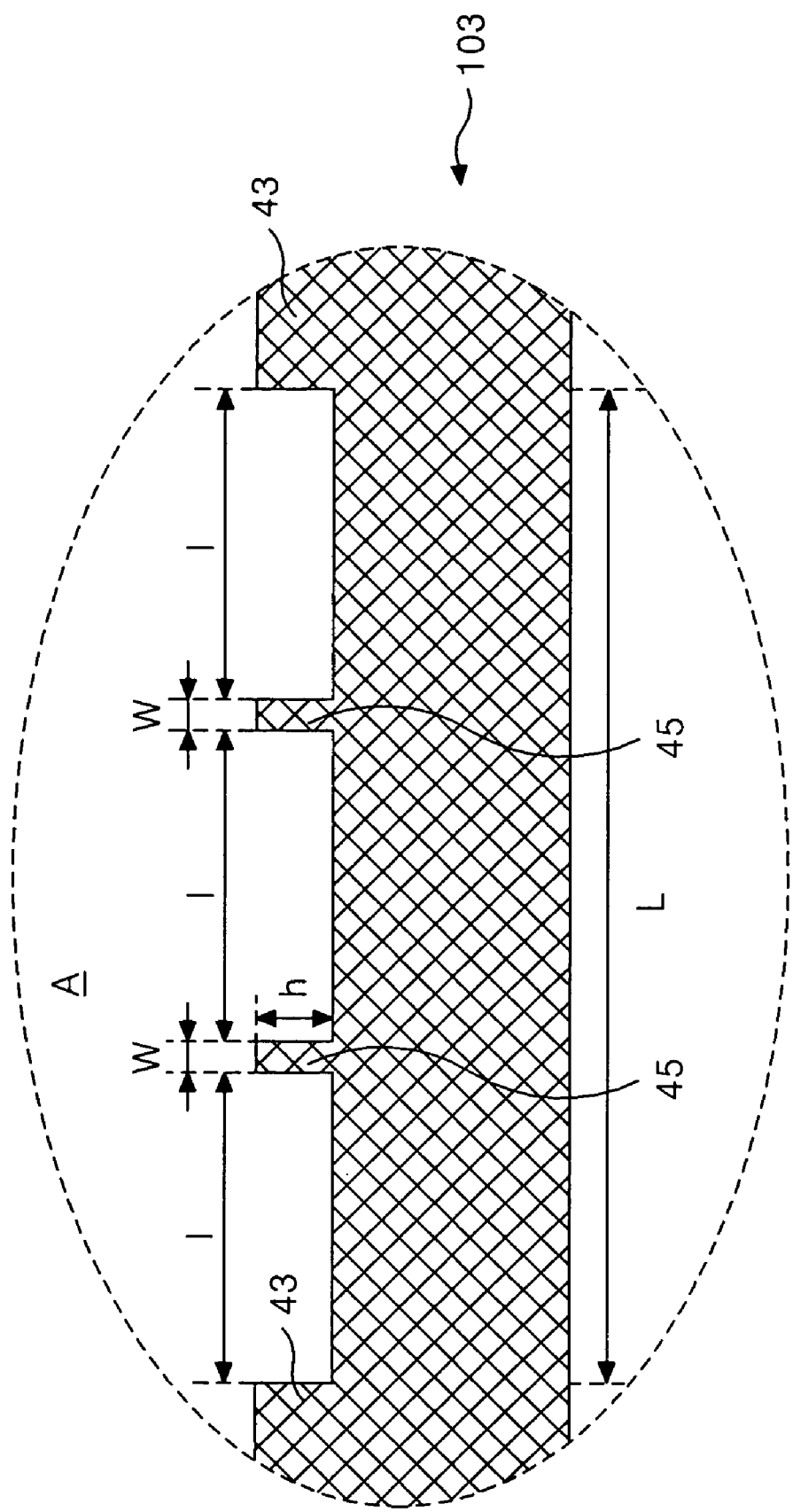

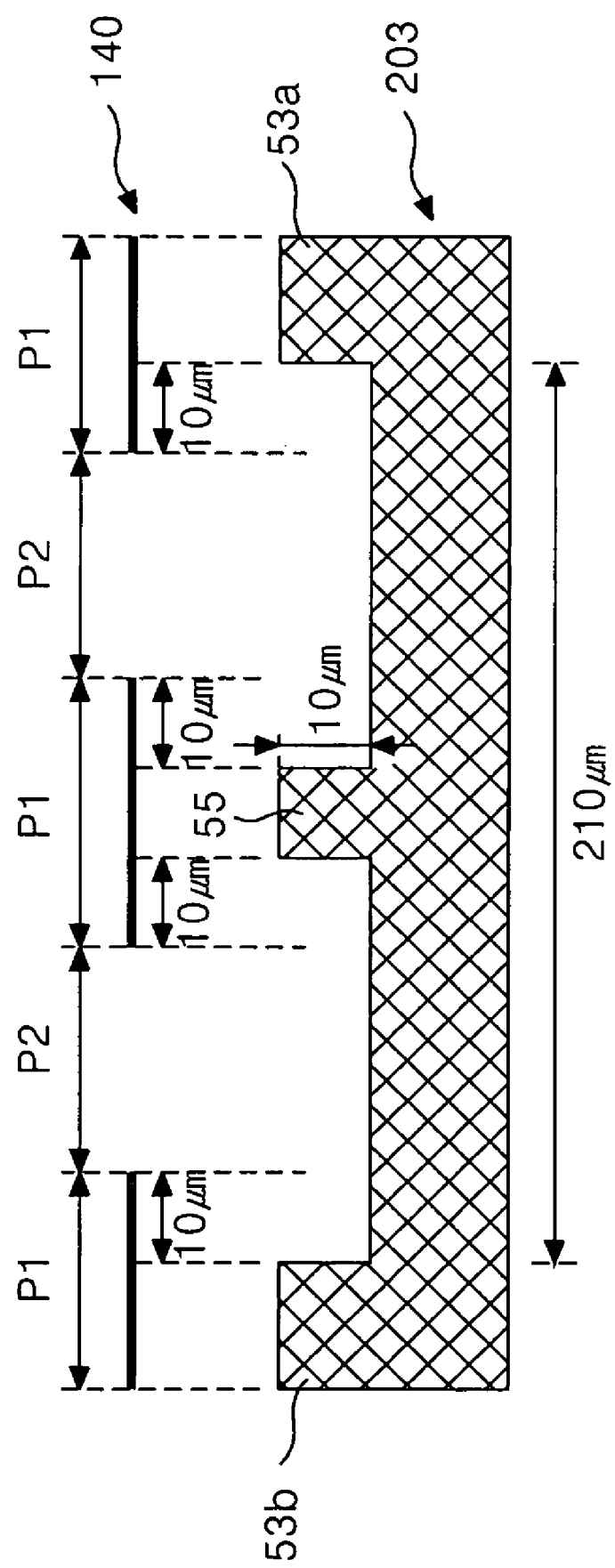

PRINTING APPARATUS AND FABRICATING METHOD THEREOF

This application claims the benefit of priority under 35 U.S.C. § 119 to Korean Patent Application No. P2005-58733, filed Jun. 30, 2005, which is incorporated by reference in its entirety herein.

FIELD OF THE INVENTION

The present embodiments relate to a printing apparatus, and more particularly to a printing apparatus that is adaptive for enabling to print a pattern of wide line width and a pattern of narrow line width with one printing plate when fabricating a liquid crystal display device, and a fabricating method thereof.

BACKGROUND

A liquid crystal display device controls light transmittance of a liquid crystal having dielectric anisotropy by using of an electric field to display a picture. A picture is displayed through a liquid crystal display panel having a liquid crystal cell matrix and a drive circuit for driving the liquid crystal display panel.

The liquid crystal display panel includes a color filter substrate and a thin film transistor substrate which are bonded with a liquid crystal layer therebetween. The color filter substrate includes a black matrix, a color filter and a common electrode sequentially formed on an upper glass substrate. The thin film transistor substrate includes thin film transistors and pixel electrodes formed at cell areas defined by crossing gate lines and data line in a lower glass substrate. The color filter substrate and the thin film transistor substrate can be formed by photolithography, etching, or use of a printing apparatus.

FIGS. 1A to 1C are diagrams depicting a process for printing a target pattern using a printing apparatus of the related art. FIG. 1A depicts a printing apparatus, including a printing roll 3 having a blanket 5 with target pattern forming material 7 spread over the blanket 5 surface. In a first printing step, the printing roll in FIG. 1A is used to print pattern forming material onto printing plate patterns 13 in a printing substrate 11 (FIG. 1B). When the pattern forming material 7 adheres to a printing plate pattern 13 on the printing substrate 11, portions of pattern forming material are removed from the printing roll, thereby creating a target pattern 15 on the surface of the printing roll 3 (FIG. 1B). Then, in a second printing step, the target pattern 15 on the printing roll is printed onto a target substrate 21, thereby creating target pattern 15 thereon (FIG. 1C). A target pattern 15 can be applied as a pattern to various parts of a liquid crystal display device, including the black matrix, color filter, gate line, data line, etc.

A printing plate pattern 13 may be formed using a mask in a photolithography or etching process. FIG. 2 illustrates an etching process for forming a printing plate pattern 13 in which a mask 29 is arranged on the printing substrate 11, exposing an exposure area P2 that can etched to form a desired printing plate pattern 13. Typically, a wet or dry etching method employing a glass substrate as the printing substrate 11 may be used. In view of the disadvantages associated with dry etching, including long process times, high manufacturing costs, and target pattern limitations regarding wide line width, wet etching processes are often preferred.

A fluoric acid solution may be used in a wet etching process. In the isotropic wet etching process depicted in FIG. 2 where the depth of etching is 10 µm, each side of the printing substrate 11 adjacent to the exposure area P2 is also etched by 10 µm. For example, if the exposure area has a line width of 10 µm and the depth of the wet etching is 10 µm, the etched area will have a line width of 30 µm.

When forming a target pattern 15 with a line width of less than 100 µm, the printing plate pattern 13 is normally formed with a height of about 10 µm. However, when forming a target pattern 15 having a line width of 100 µm or more where the height of the printing plate pattern 13 is 10 µm, the target pattern formed in the second printing step may carry an inappropriate separation or break.

FIGS. 3A-3C illustrate a pattern separation problem that can result when etching e.g., a wide line width patterns (e.g., 100 µm or greater) greatly exceeding the height of the printing plate pattern (e.g., 10 µm). In a case where the gap between printing plate patterns 13 is 100 µm or greater and the height of the printing plate pattern 13 is 10 µm, target pattern forming material 7 may inappropriately adhere to the printing substrate 11 between adjacent printing plate patterns 13 (FIGS. 3A, 3B). As a result, a portion of target pattern forming material 7 of width X which is designated for a wide line width target pattern 15 may become inappropriately displaced on the printing substrate 11 (FIG. 3B), so that the resultant target pattern 15 formed in the second printing step carries an inappropriate gap having a width X corresponding to the displaced portion of target pattern forming material (FIG. 3C).

In view of these limitations, related art approaches may utilize one printing substrate to correctly form a target pattern having a wide line width of 100 µm or greater and a second printing substrate to form a target pattern having a wide line width less than 100 µm. Accordingly, there is a need in the art for a fabrication methodology adapted for printing wide line width patterns and narrow wide line width patterns using one printing substrate.

SUMMARY

In one aspect, a printing apparatus includes a printing roll having target pattern forming material spread on its surface, a printing substrate, including at least one barrier rib pattern spaced between a pair of adjacent printing plate patterns, and a target substrate configured to receive target pattern forming material remaining on the printing roll following transfer of target forming material to the printing substrate.

An exemplary pair of adjacent printing plate patterns may be separated by a distance of at least 100 µm and may contain one or more barrier rib patterns therebetween. The height of a barrier rib pattern may be about 10% to 45% of the gap length between the barrier rib pattern and an adjacent printing plate pattern or barrier rib pattern. In addition, the gap distance between adjacent printing plate and/or barrier rib patterns may be about eightfold to tenfold the height of the printing plate and/or barrier rib patterns defined by the gap therebetween. The line width of a barrier rib pattern may be about 5% to 10% of the length of the gap between the barrier rib pattern and an adjacent printing plate or barrier rib pattern.

In another aspect, a method of using a printing apparatus to fabricate a target substrate includes providing a printing substrate including at least one barrier rib pattern disposed between a pair of adjacent printing plate patterns, providing a printing roll having target pattern forming material spread thereon, printing target pattern forming material onto printing plate patterns and barrier rib patterns disposed on the printing substrate, and printing a target pattern on a target substrate from the target pattern forming material remaining on the printing roll after the transfer to the printing substrate.

The printing plate patterns and the barrier rib patterns may be formed by wet etching and they may be disposed or formed according to various heights, line widths and spacing therebetween.

BRIEF DESCRIPTION OF THE DRAWINGS

FIGS. 4A to 4D are diagrams showing a method of printing a target pattern according to selected aspects of the present invention.

FIG. 5 is a diagram showing a part of a printing plate according to an aspect of the present invention.

FIGS. 6A to 6C are diagrams showing a process of fabricating a portion of a printing plate and a process for printing a target pattern using the printing plate.

DETAILED DESCRIPTION

Figure 1A:
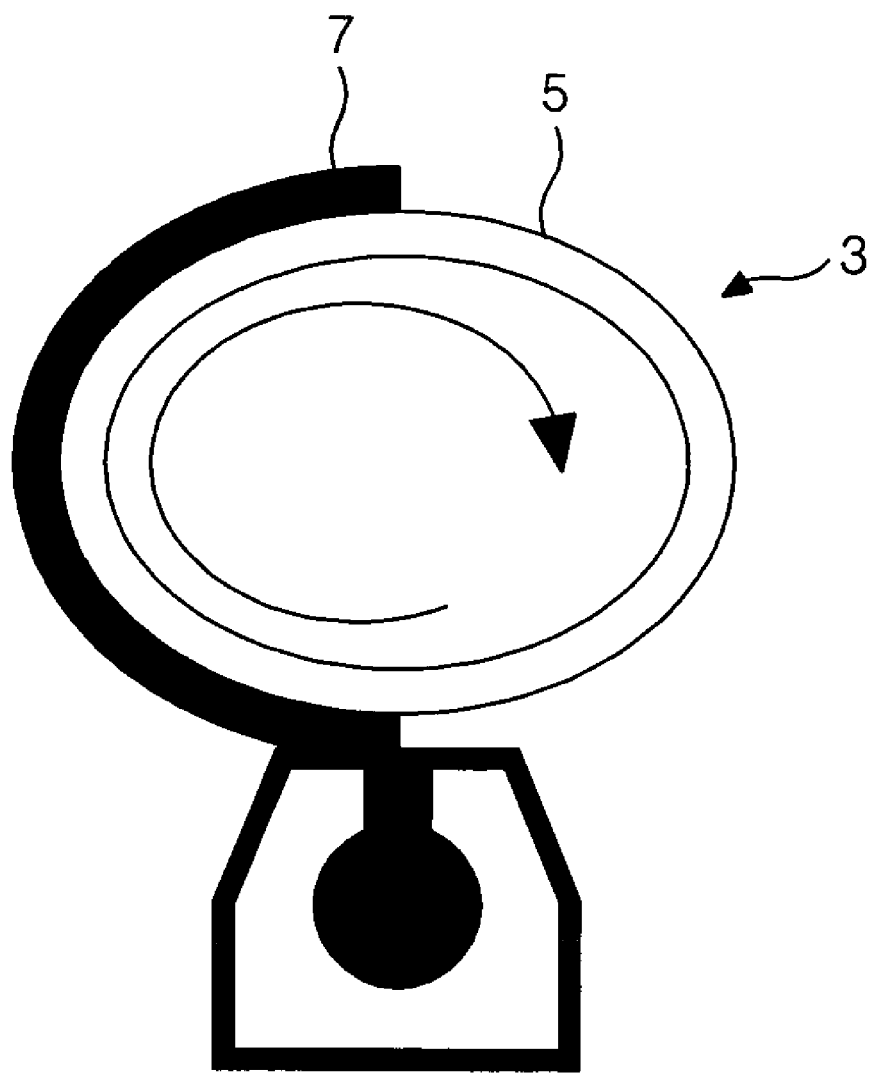
FIGS. 1A to 1C are diagrams showing a printing process for forming a pattern according to the related art.
Figure 1B:
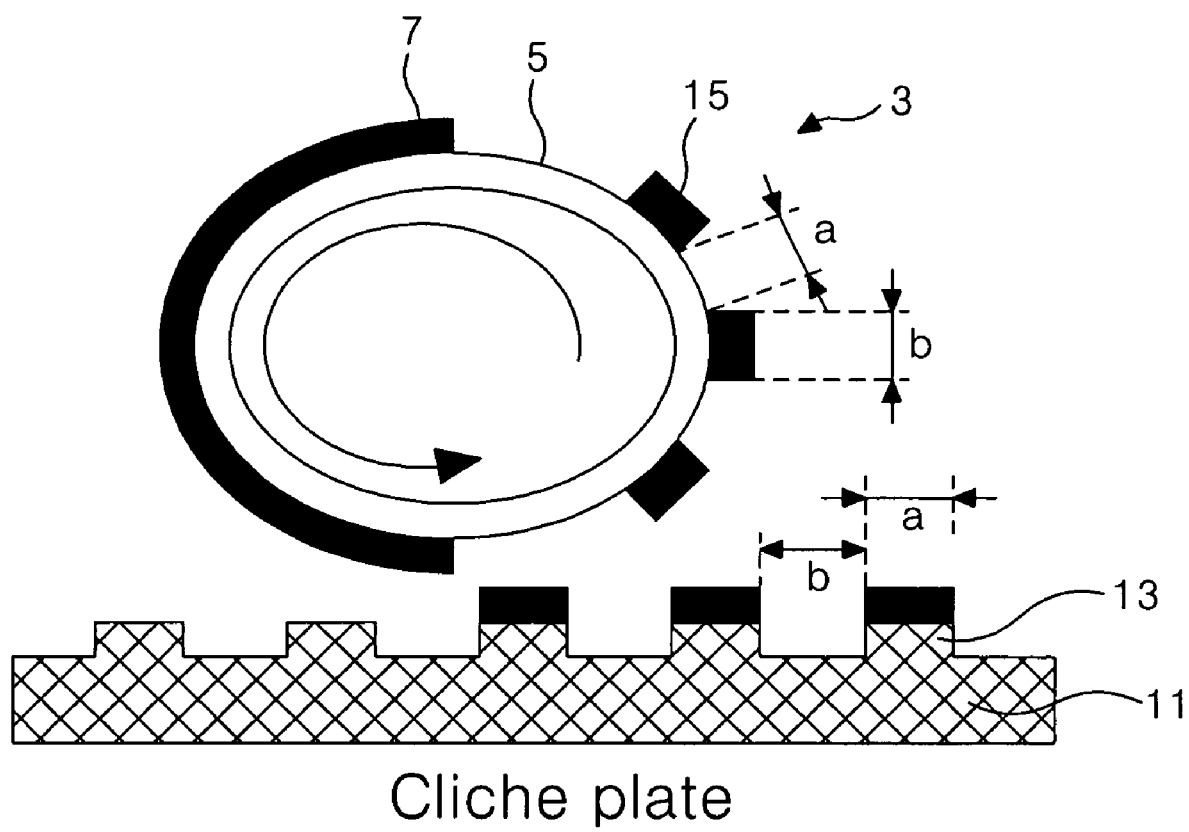
Figure 1C:
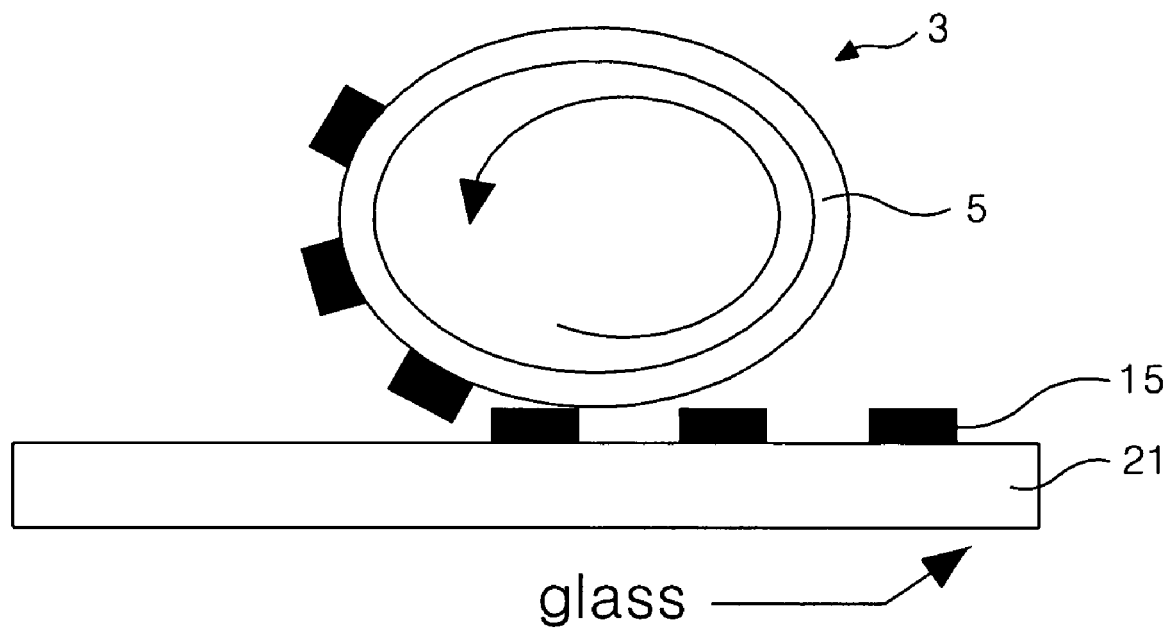
Figure 2:
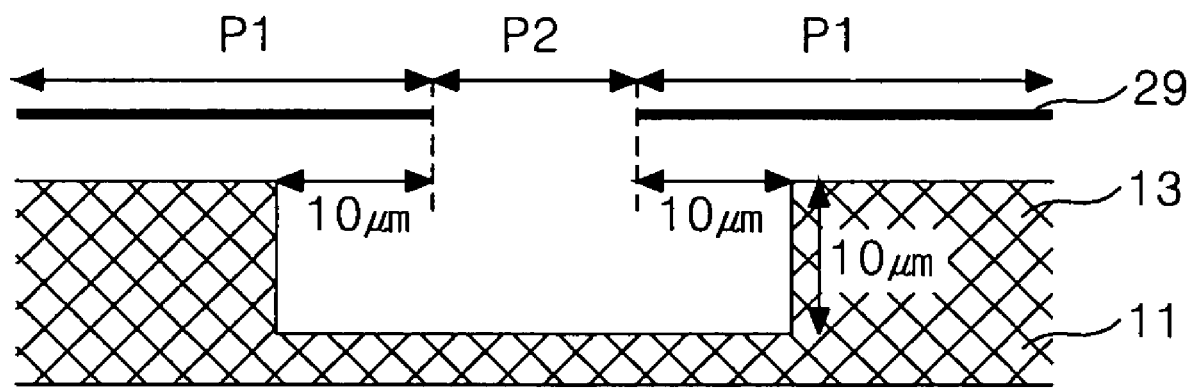
FIG. 2 is a diagram showing a related art method for forming a printing plate pattern.
Figure 3A:
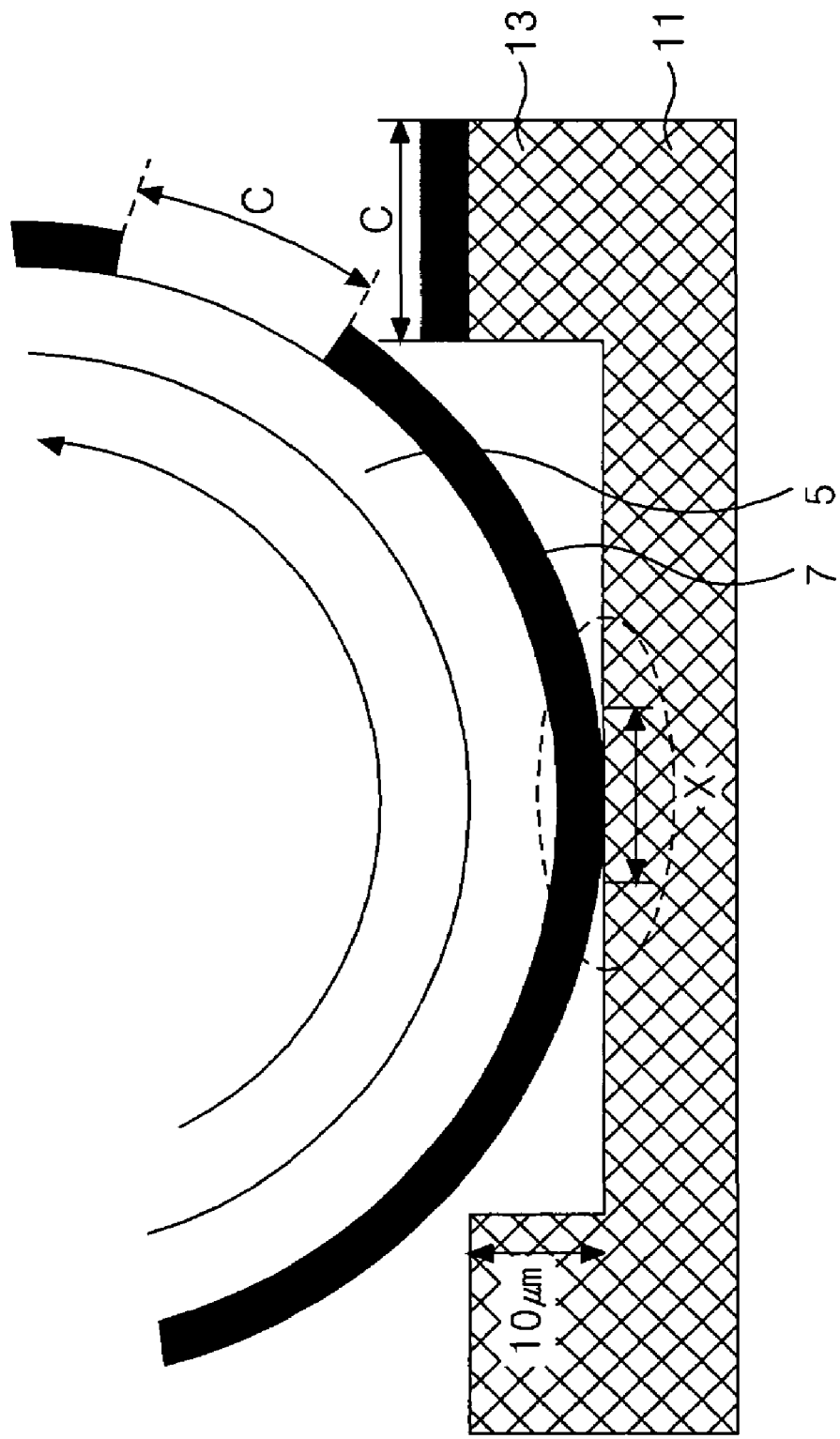
FIGS. 3A to 3C are diagrams illustrating a pattern printing problem according to the related art.
Figure 3B:
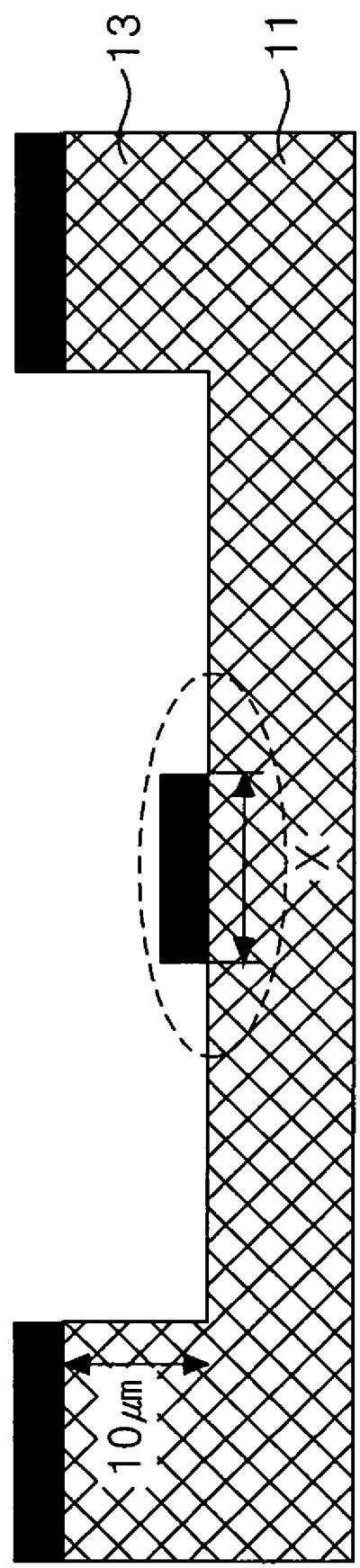
Figure 3C:
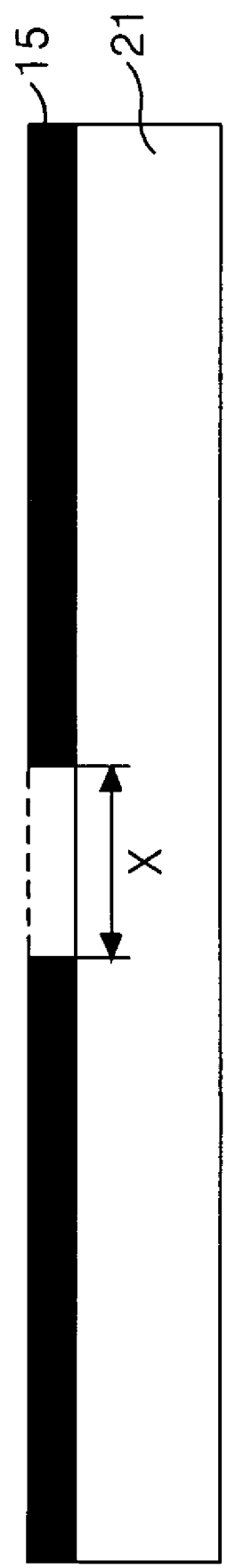

FIGS. 4A to 4D depict a printing process adapted for printing wide line width patterns and narrow wide line width patterns on one printing substrate. The printing apparatus depicted in FIGS. 4A to 4D, includes a printing roll 100 having target pattern forming material 101 printed in a first printing step onto printing plate patterns 43 and barrier rib patterns 45 in a printing substrate 103. As target pattern forming material 101 is removed from the printing roll, a target pattern 49a is formed thereon. The target pattern 49a on the printing roll 100 can then be printed onto a target substrate 47 to form a target pattern 49b that extends in length as pressure is applied in a second printing step.

Printing plate patterns may be separated on a printing plate by gap distances greater than, less than, or equal to 100 μm. The printing plate patterns 43 adjacent to the A region depicted in FIG. 4B are representative of printing plate patterns separated by gap distances equal to or greater than 100 μm. FIG. 4B depicts representative barrier rib patterns 45 formed in an area where the gap length between adjacent printing plate patterns 43 is 100 μm or more. The printing plate patterns 43 and barrier rib patterns 45 may be formed using a mask in a photolithography or etching process, preferably a wet etching process.

Figure 4A:
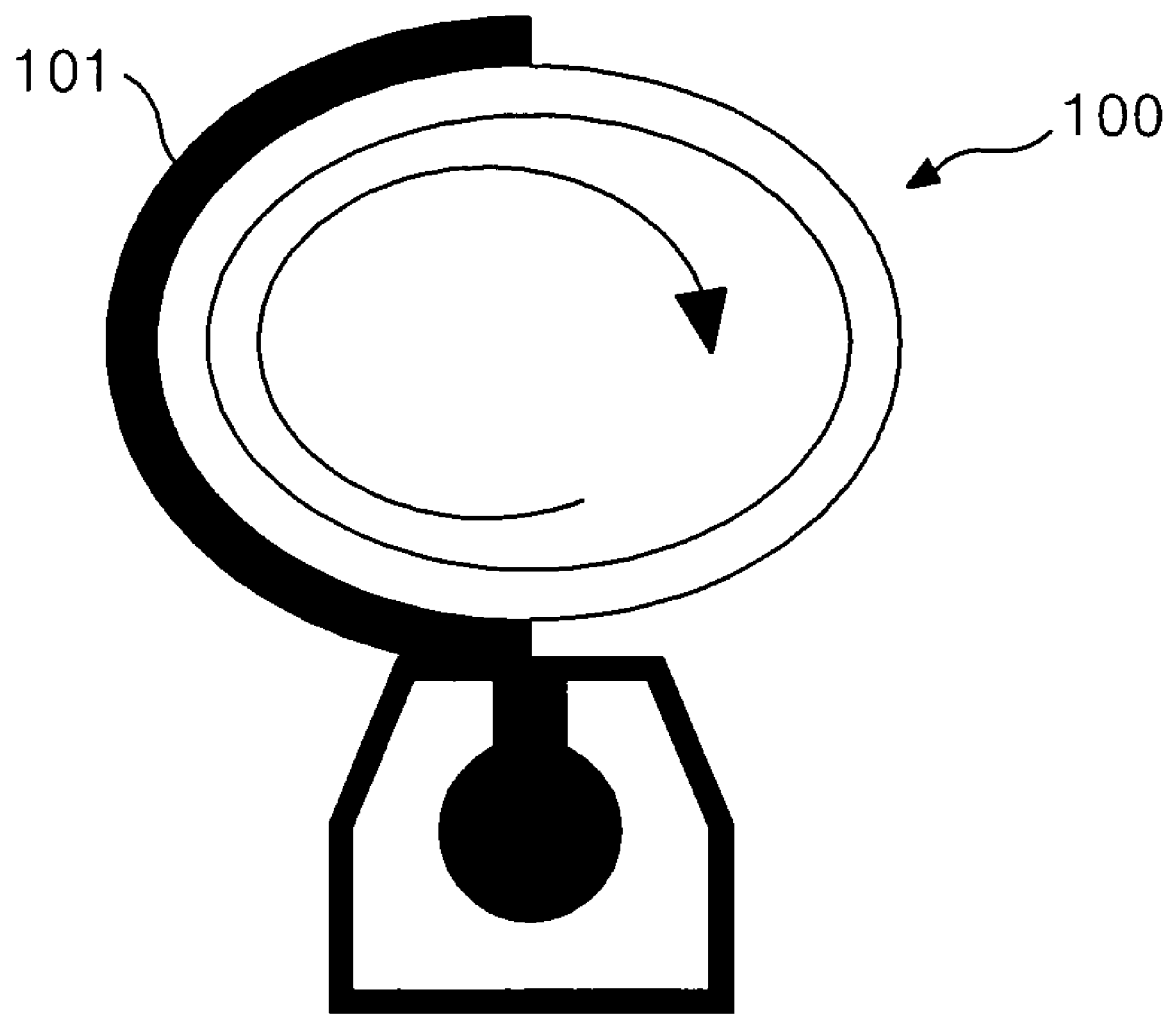
Figure 4B:
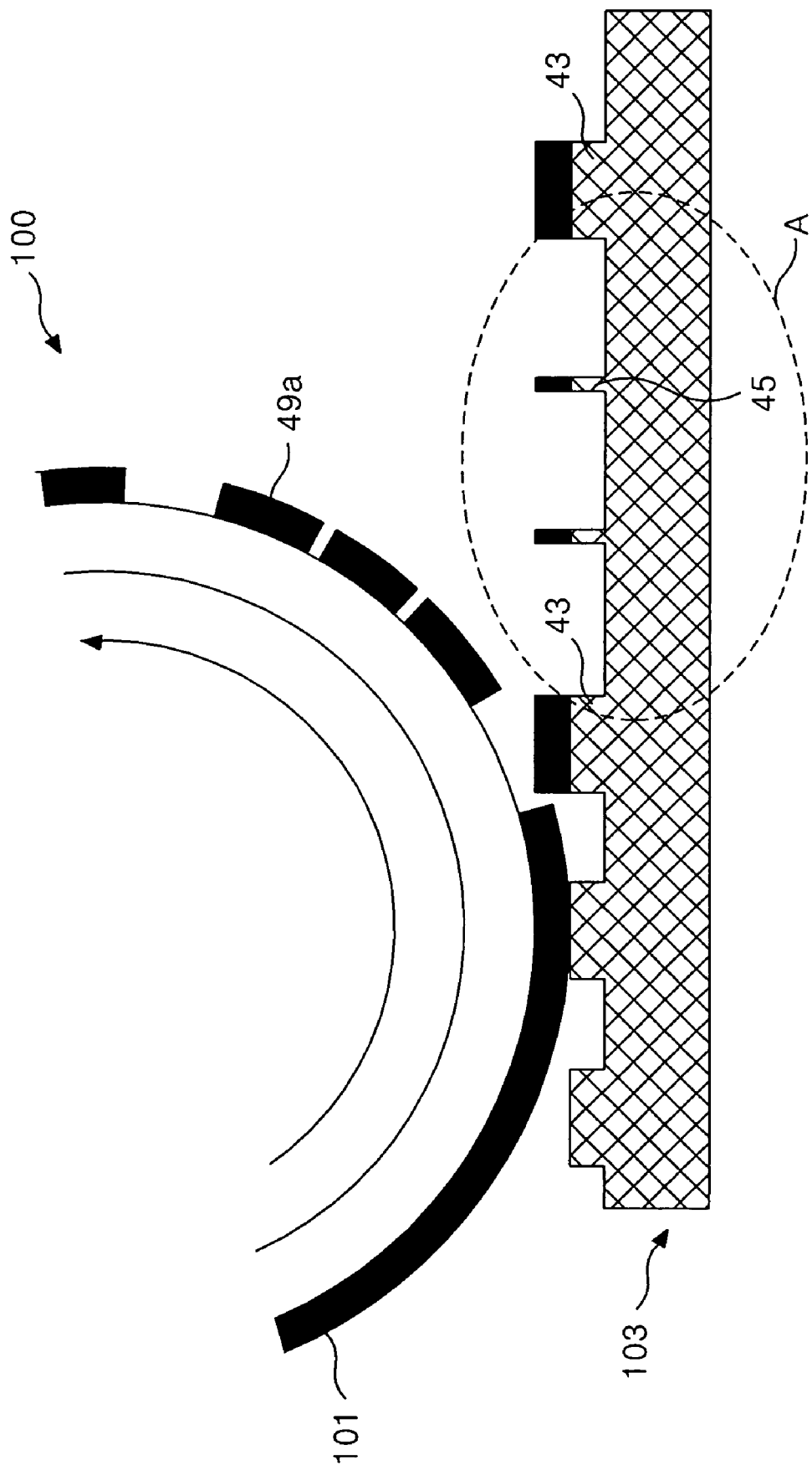
Figure 4D:
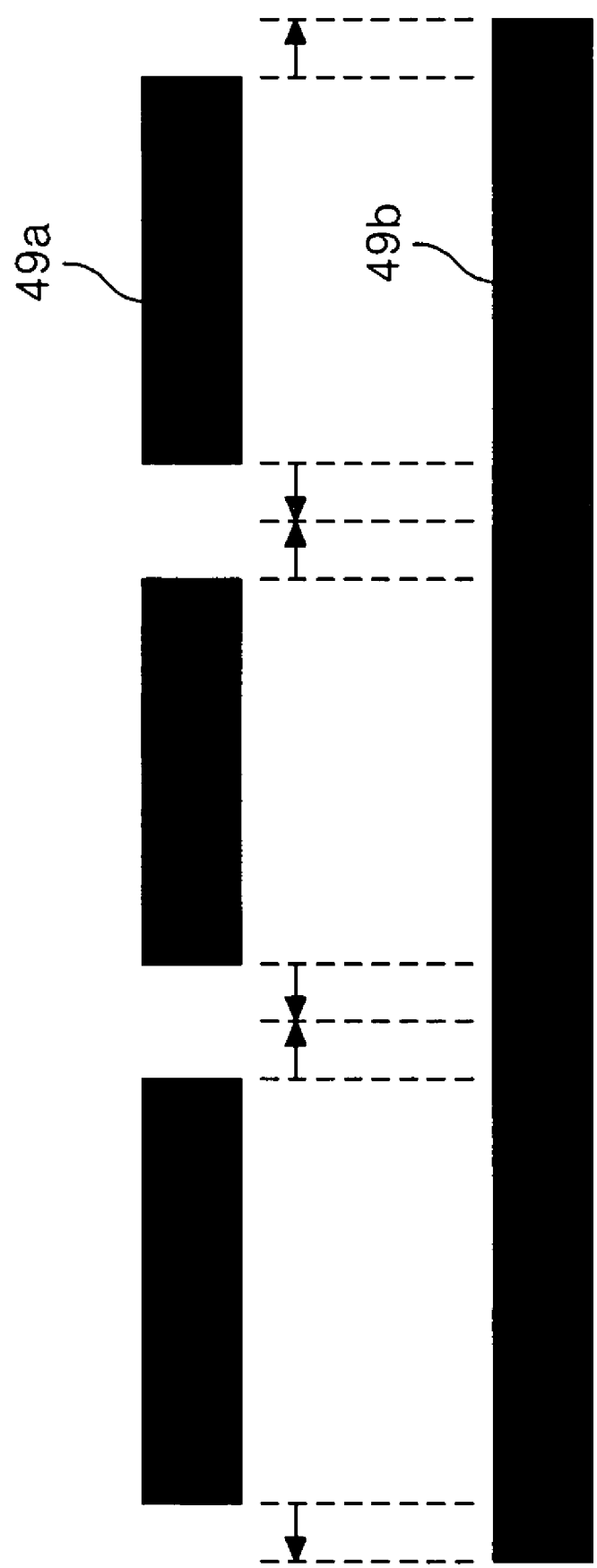

The barrier rib patterns can facilitate correct formation of a wide line width target pattern as exemplified by target pattern 49b depicted in FIGS. 4C and 4D. As a result, one printing substrate 103 can be used to facilitate printing of a target pattern 49b having a wide line width of 100 μm or more, as well as a target pattern 49c having a narrow line width of less than 100 μm.

FIG. 4A depicts a target pattern forming material 101 being spread onto a printing roll 100. The target pattern forming material 101 may include a polymeric solution melted in an organic solvent, forming a viscous, paste-like material capable of deforming under pressure.

A first printing step is performed in which the target pattern forming material 101 spread on the printing roll 100 is printed onto printing plate patterns 43 and barrier rib patterns 45 disposed on a printing substrate 103 (FIG. 4B). As target pattern forming material 101 on the printing roll 100 adheres to printing plate patterns 43 and barrier rib patterns 45 on the printing substrate 103, target pattern forming material 101 remaining on the printing roll 100 defines a target pattern 49a thereon (FIG. 4B).

The target pattern 49a on the printing roll 100 is then printed onto a target substrate 47 to form an extended target pattern 49b as pressure is applied in a second printing step (FIG. 4C). In particular, as pressure is applied from the printing roll 100, portions of the target forming material expand in a manner depicted by the arrows in FIG. 4D. The extensions denoted by arrows in FIG. 4D represent gapped areas in the target pattern 49a filled in as pressure is applied. Accordingly, the target pattern 49b formed on the target substrate may include designated length extensions of target pattern forming material at gapped ends of the target pattern 49a, including those defined by target pattern forming material areas printed onto the barrier rib patterns 45 in the first printing step.

Target pattern forming material may be extended at each gapped end of target pattern forming material 49a by about 5% to 10% of the length between adjacent gaps defined by areas printed onto adjacent printing plate pattern 43 and/or barrier rib patterns 45 on the printing substrate 103. As a consequence of the extensions, the angle of target pattern forming material at extended end regions relative to a printing substrate 43 or target substrate 47 may vary from e.g., 90 degrees to about 20 degrees, respectively.

A barrier rib pattern 45 may be designed to have a width corresponding to 5% to 10% of the gap between adjacent printing plate pattern 43 and/or barrier rib patterns 45. As depicted in FIG. 4D, the extension of target pattern forming material 101 in the second printing step allows for gapped target pattern forming material 49a from the first printing step to be connected after pressure is applied in the second printing step (FIG. 4C). Accordingly, the use of barrier rib patterns 45 enables a desired wide line width target pattern 49b to be formed without separation. Exemplary target patterns may be formed in a liquid crystal display device, including those formed in a black matrix, a color filter, a gate line, or data line, etc.

The use of barrier rib patterns 45 enable printing of target patterns having both line widths of 100 μm or more and line widths of 100 μm or less using one printing substrate. By incorporating a barrier rib pattern 45 between printing plate patterns 43 separated by 100 μm or more in the first printing step, target pattern forming material 101 adheres to the barrier rib pattern 45 instead of the gap between the printing plate patterns 43 in the first printing step. However, because the width of the barrier rib pattern 45 can match a length by which the target pattern forming material can be extended in the second printing process, a target pattern can be correctly formed having a wide line width.

FIG. 5 illustrates the area (A) depicted in the printing substrate 103 of FIG. 4B. The exemplary A area depicted in FIG. 5 corresponds to region having a gap (L) between adjacent printing plate patterns 43 of 100 μm or more in which barrier rib patterns 45 are formed therebetween. The width (W) of each barrier rib pattern 45 is formed to be 5% to 10% of the gap (I) between adjacent printing plate patterns 43 and barrier rib patterns 45. Preferably, the height (h) of a printing plate pattern 43 or barrier rib pattern 45 is about 10% to 45% of the gap (I) between adjacent printing plate patterns 43 and barrier rib patterns 45 disposed between the adjacent pair of printing plate patterns 43 separated by a gap (L) of 100 μm or more.

If the height (h) of the printing plate pattern and the barrier rib pattern is too low (less than 10%), target pattern forming material may inappropriately adhere to gaps between the printing plate patterns 43 and barrier rib patterns 45 during the first printing process, precluding the above advantages obtained when using barrier rib patterns 45 as described above. The height (h) of the printing plate patterns and the barrier patterns is preferably limited to 45% or less.

Preferably, a gap (I) between a barrier rib pattern 45 and an adjacent printing plate pattern 43 or barrier rib pattern 45 is formed where the length of the gap (I) is eightfold to tenfold the height (h) of adjacent printing plate patterns 43 or barrier rib patterns 45 (FIG. 5). If the gap (I) is greater than tenfold the height of the of the printing plate pattern 43 or barrier rib pattern 45, however, target pattern forming material may adhere to the gap (I) between the barrier rib patterns 45 and an adjacent printing plate pattern 43 or barrier rib pattern 45 in the first printing process, thereby negating the advantages of using a barrier rib pattern 45 as described above. On the other hand, if the gap (I) is less than eightfold the height (h) of the printing plate pattern 43 or barrier rib pattern 45, it is difficult to use wet etching to accurately form the printing plate pattern 45 and barrier rib pattern 43. A barrier rib pattern 45 may be formed to have a cross-section according to a variety of shapes, including but not limited to a line, hexagon, lozenge, circle and the like.

FIG. 6A illustrates the use of wet, isotropic etching in conjunction with an exemplary printing methodology. When the height (h) of a printing plate pattern 53a, 53b or barrier rib pattern 55 is isotropically etched, side surfaces of the printing plate patterns 53a, 53 b and the barrier rib pattern 55 shielded by a mask in non-exposure areas P1 are similarly etched to a degree matching the depth or height (h) of etching in the exposure areas P2. Accordingly, the mask 140 is arranged to facilitate a degree of etching appropriate for desired printing plate pattern and barrier rib pattern widths.

The width of the non-exposure areas P1 extending from the sides of the printing plate patterns 53a, 53b and the barrier rib pattern 55 are the same as the corresponding height (h) of the printing plate patterns 53a, 53b and the barrier rib pattern 55. If the height (h) of the printing plate patterns and the barrier rib pattern were to exceed the abovementioned 45% gap width and the width of the non-exposure areas P1 extending from of the mask were to similarly extend to match the height (and thereby exceed the above mentioned 45% gap width in both directions), the adjacent non-exposure areas P1 could become connected so as to preclude the exposure areas P2 from forming. Accordingly, the height (h) of the printing plate patterns and the barrier rib patterns are limited to 45% or less.

Figure 6B:
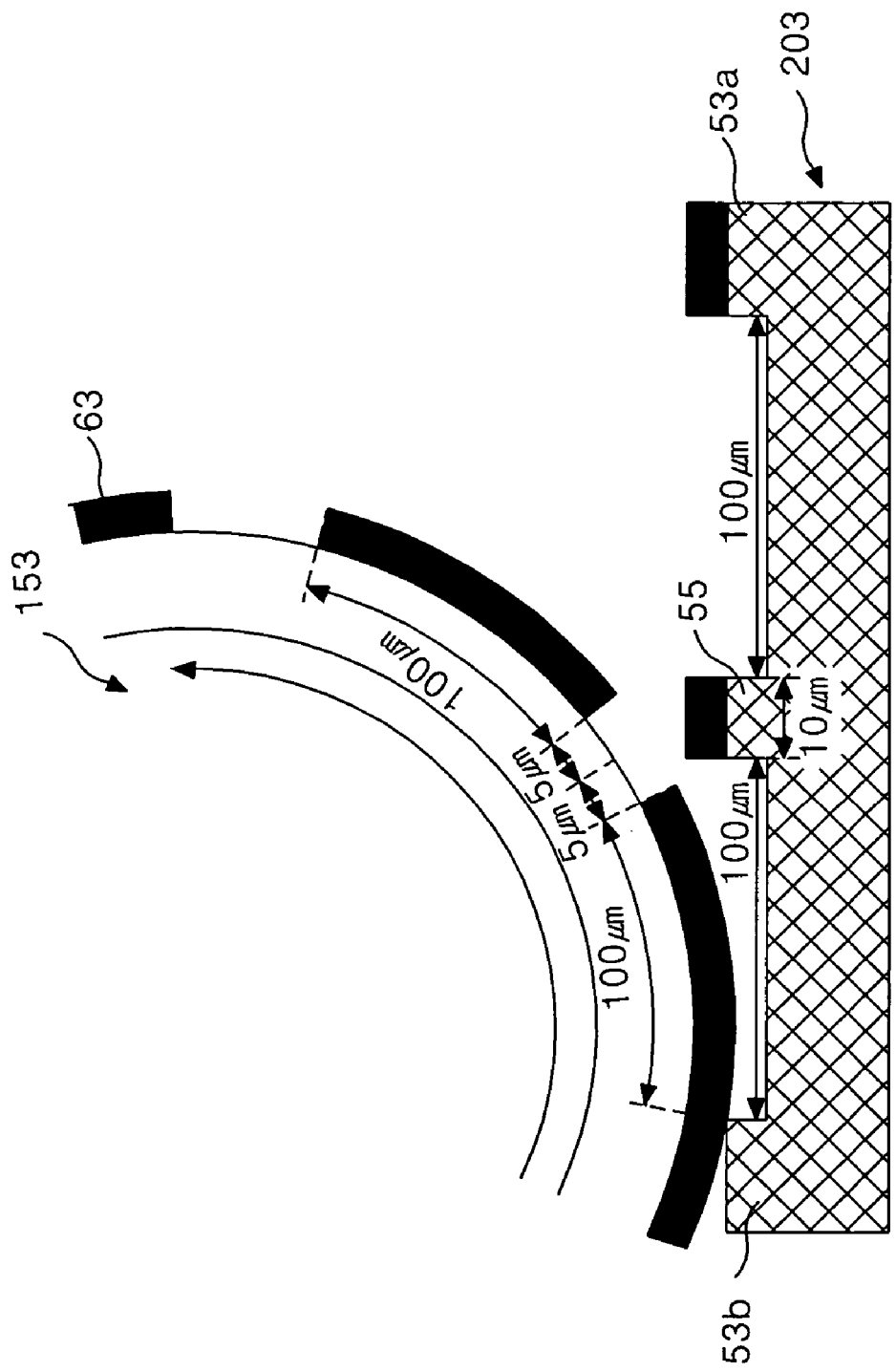
Figure 6C:
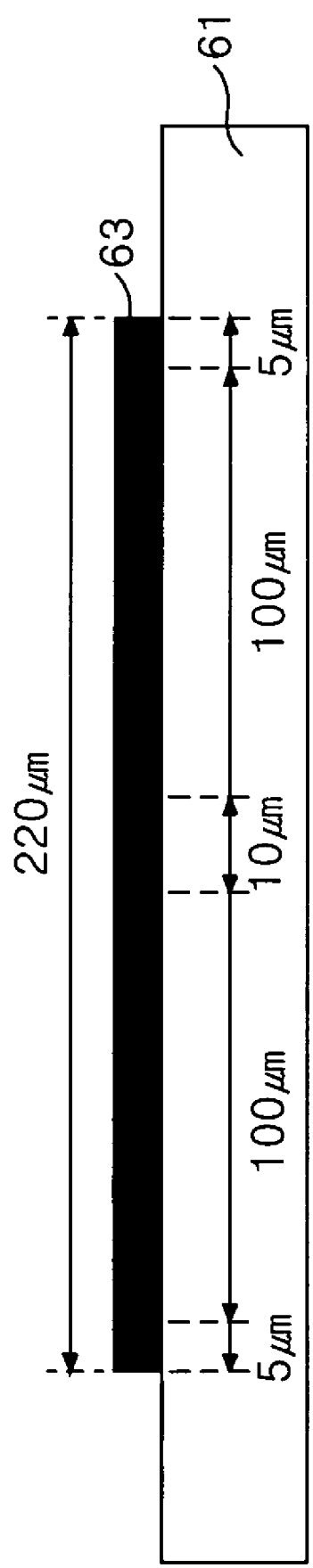

FIGS. 6A to 6C illustrate benefits and characteristics of an exemplary embodiment in which a gap between a first printing plate pattern 53A and a second printing plate pattern 53B adjacent thereto is 210 μm. Although not shown, the printing substrate 203 depicted in FIGS. 6A to 6C may further include gaps between adjacent printing plate patterns spaced less than 100 μm from one another, as well as gaps elsewhere spaced from one another by 100 μm or more.

FIG. 6A depicts a process for fabricating a printing substrate 203 having printing plate patterns 53A, 53B and a barrier rib pattern 55 disposed thereon. The patterns may be fabricated by a photolithography process employing a glass substrate and a mask 140 having a light shielding part P1 and a light transmission part P2. The printing substrate may then be etching using a fluoric acid solution in an area corresponding to the light transmission part P2. Preferably, the etching is performed to a depth of 10% to 45% of the narrowest gap (100 μm) within a gap between printing plate patterns 53a, 53b separated by 100 μm or more. In FIG. 6A, the substrate 203 is etched to depth of 10 μm which is 10% of the 100 μm. The 10 μm depth further corresponds to the non-exposed side surfaces of patterns 53A, 53B, 55 adjacent to the light transmission part P2 which are similarly etched by 10 μm. Accordingly, the mask 140 is arranged so that the width of the light shielding parts P1 is extended by 10 μm on each side surface relative to desired patterns 53A, 53B, 55. Of course, the mask arrangement is varied according to the depth of the etching.

FIG. 6B depicts the first printing step in which target pattern forming material on the printing roll 153 is printed onto the printing plate patterns 53A, 53B and the barrier rib pattern 55 disposed on the printing substrate 203. The target pattern forming material retained on the printing roll 153 thereafter includes gaps corresponding to target pattern forming material area printed onto the barrier rib pattern 55 and the printing plate patterns 53A, 53B. The target pattern forming material retained on the printing roll 153 defines a target pattern 63 that can be subsequently printed onto a target substrate 61 in a second printing step (FIG. 6C).

The target pattern 63 formed on the printing material can be extended when pressure is applied in the second printing step. As a result, the resulting extensions can produce line width increases of 5% to 10% at side surfaces corresponding to where the printing plate patterns 53a, 53b and the barrier rib pattern 55 are closely adhered (FIGS. 6B, 6C). Accordingly, even though there is a barrier rib pattern 55 between a first printing plate pattern 53a and a second printing plate pattern 53B, extension of the target pattern forming material can fill in the gap produced by the barrier rib pattern 55 in the first printing step. As exemplified in FIG. 6C, the line width extensions can account for a wide line width pattern 63 of 220 μm without gaps on a substrate 61. In other words, an appropriate target pattern 63 can be formed by connecting target pattern forming material through line width extensions produced in the second printing step to form a wide line width target pattern 63 according to a desired pattern or shape.

The use of barrier rib patterns can accurately enable wide line width target patterns from printing plate patterns separated by 100 μm or more. In the embodiment exemplified in FIG. 6B, the width of the barrier rib pattern 55 (10 μm) is 10% of the gap between the barrier rib pattern 55 and the adjacent printing plate patterns 53A, 53B. However, the width of the barrier rib pattern 55 may be varied according to the desired characteristics of the target pattern 63 and according to characteristics of the target pattern forming material.

Figure 7:
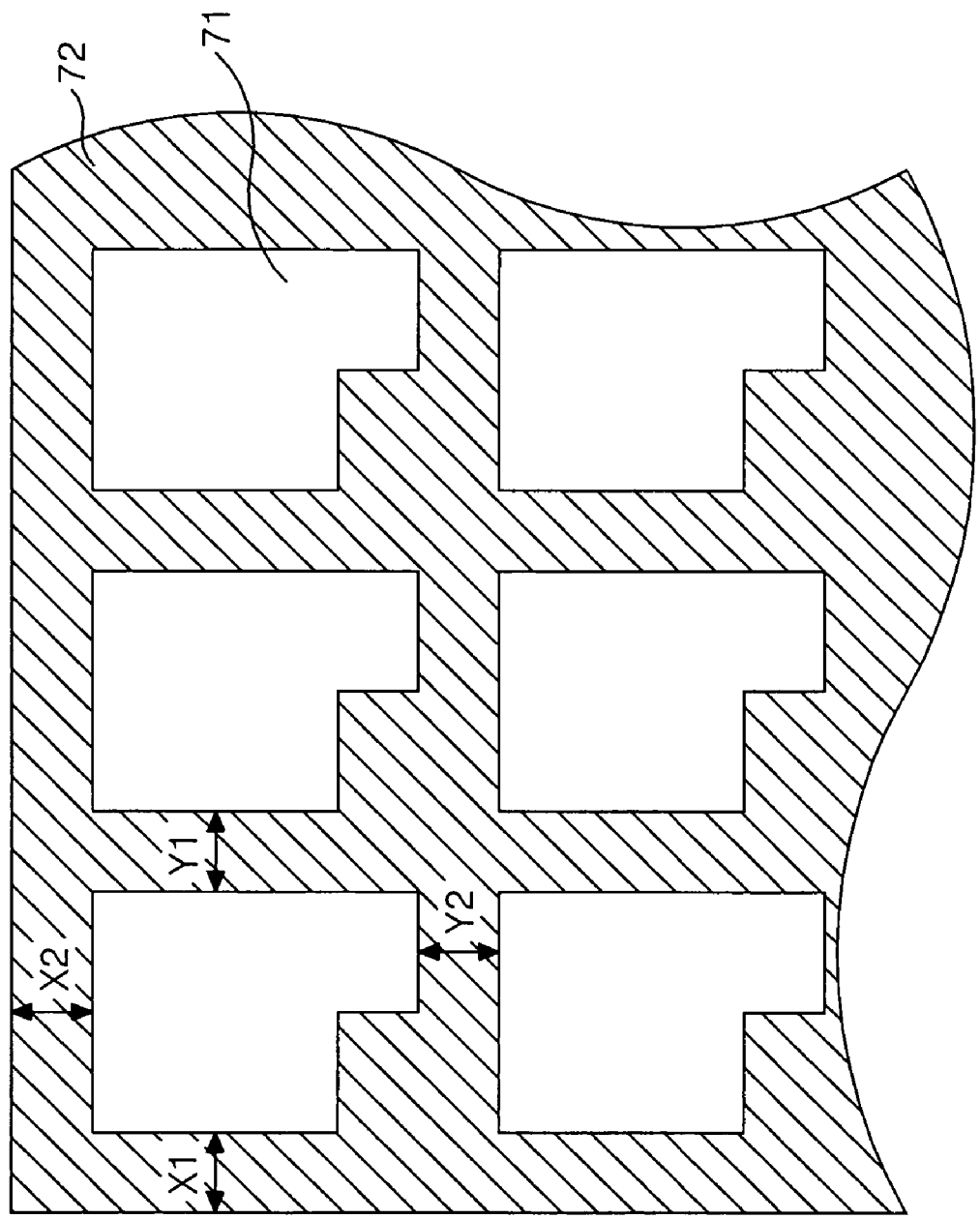
FIG. 7 is a diagram showing a black matrix pattern.

In a representative embodiment, a black matrix pattern 72 may be formed on a color filter substrate of the liquid crystal display device as depicted in FIG. 7. The black matrix 72 includes areas X1, X2 of wide line width (measured in millimeters) formed at the border of the color filter substrate, and areas Y1, Y2 of narrow line width (measured in micrometers) formed between color filters 71. The wide line width areas X1, X2 and the narrow line width areas Y1, Y2 may be formed using a printing substrate with barrier rib patterns disposed at locations requiring a wide line pattern. Since the wide line width areas X1, X2 and the narrow line width areas Y1, Y2 can be formed using one printing substrate, the use of barrier rib patterns facilitates more efficient fabrication of liquid crystal display devices.

The above described printing apparatus makes it possible to print a target pattern of wide line width and the target pattern of narrow line width with one printing substrate. Moreover, incorporation of the above described barrier rib patterns between the printing plate patterns separated from one another 100 μm or more can prevent formation of target patterns carrying inappropriate gaps therein.

Although the present invention has been explained by the embodiments shown in the drawings described above, it should be understood that the invention is not limited to the embodiments, and that various changes or modifications are possible without departing from the spirit or scope of the invention. Accordingly, it is intended that the present invention cover such modifications and variations provided they come within the scope of the appended claims and their equivalents.

What is claimed is:

1. A printing apparatus for patterning a target substrate, comprising:
   a printing roll comprising target pattern forming material;
   a printing substrate comprising:
   at least one pair of adjacent printing plate patterns defining a first gap having a first gap length; and
   at least one barrier rib pattern spaced between the at least one pair of adjacent printing plate patterns, the barrier rib pattern and a printing plate pattern adjacent thereto defining a second gap having a second gap length,
   wherein the printing substrate is configured to receive target pattern forming material from the printing roll; and
   a target substrate configured to receive target pattern forming material remaining on the printing roll following transfer of target forming material to the printing substrate.

2. The printing apparatus of claim 1, wherein the first gap length is about 100 μm or more.

3. The printing apparatus of claim 1, comprising a plurality of barrier rib patterns spaced between the at least one pair of adjacent printing plate patterns.

4. The printing apparatus of claim 1, wherein the height of a printing plate or barrier rib pattern is about 10% to 45% of the second gap length.

5. The printing apparatus of claim 1, wherein the second gap is eightfold to tenfold the height the printing plate pattern or barrier rib pattern defining the second gap.

6. The printing apparatus of claim 1, wherein the line width of the at least one barrier rib pattern is between about 5% and 10% of the second gap length.

7. The printing apparatus of claim 1, wherein the printing substrate comprises a first pair of adjacent printing plate patterns separated by at least 100 μm and a second pair of adjacent printing plate patterns separated by less than 100 μm.

8. The printing apparatus of claim 1, wherein the target pattern forming material is configured to form a target pattern on the target substrate having an extended line width in comparison to the corresponding target pattern formed on the printing roll.

9. The printing apparatus of claim 1, wherein the target pattern forming material comprises a viscous polymeric composition capable of deforming under pressure.

* * * * *

UNITED STATES PATENT AND TRADEMARK OFFICE
CERTIFICATE OF CORRECTION

| | | |
|---|---|---|
| PATENT NO. | : 7,582,331 B1 | Page 1 of 1 |
| APPLICATION NO. | : 11/304447 | |
| DATED | : September 1, 2009 | |
| INVENTOR(S) | : Yoo et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 714 days Delete the phrase "by 714 days" and insert -- by 930 days --

Signed and Sealed this

Thirtieth Day of March, 2010

David J. Kappos
*Director of the United States Patent and Trademark Office*